April 21, 1931.                C. S. JOHNSON                1,802,150
                              INDICATING DEVICE
                             Filed June 23, 1930
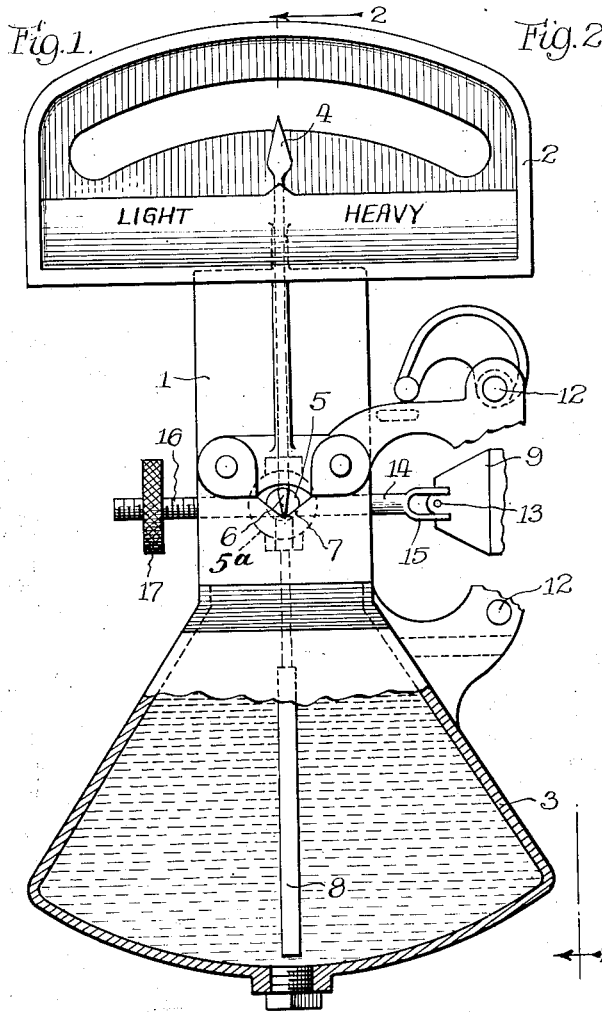
Inventor:
Charles S. Johnson,
By Chindahl Parker Carlson
                Atty's.

Patented Apr. 21, 1931

1,802,150

UNITED STATES PATENT OFFICE

CHARLES S. JOHNSON, OF CHAMPAIGN, ILLINOIS

INDICATING DEVICE

Application filed June 23, 1930. Serial No. 462,949.

This invention relates generally to weighing scales and more particularly to an indicating device for a beam scale.

In weighing materials, such for example, as sand and gravel used in concrete mixes, wherein the weighing apparatus is usually located out in the open and subjected to varying atmospheric and temperature conditions, it has been found difficult readily to obtain an accurate balance. Generally the material is weighed in a container suspended from the platform or scale member of a weighing device, the material being run into the container from an overhead hopper controlled by a suitable gate. It will be opparent that when the sand or gravel is being discharged into the container, it is desirable to have some method of indicating the approach of a balance somewhat ahead of time so as to give ample opportunity to close the gate sufficiently to reduce the rate of discharge and thus to obtain an accurate control of the final balance.

Efforts have been made to use an indicating pointer or dial type scale but with this type of weighing mechanism inaccuracies occur due to corrosion, temperature changes and the accumulation of foreign material on the movable parts. Because of the accuracy of the beam type of scale and the fact that it is provided with adjusting devices for establishing its accuracy and sensitiveness from time to time, this type of scale is preferred although, as will be apparent, the beam does not indicate in a satisfactory manner the approach of a balance so as to enable the operator to cut down the flow of material and obtain an accurate final balance.

It is the general object of the invention to provide an improved indicating device for beam scales, adapted to indicate when the beam is approaching a balance and, when the beam is nearly balanced, to be entirely free of the beam so as to permit the final balance to be determined by the beam scale.

Another object of the invention is to provide such an indicating attachment of new and improved construction embodying a pendulum for returning the indicating pointer to its neutral position and a liquid for dampening the vibrations of the pointer.

A further object is to provide a new and improved indicating device of simple and rugged construction, and which in some aspects is an improvement on that disclosed in my Patent No. 1,712,767, issued May 14, 1929.

Further objects and advantages of the invention will be understood from the following detailed description taken in connection with the accompanying drawings, in which:

Fig. 1 is a front elevation, partly in section, of a preferred form of the invention.

Fig. 2 is a view approximately along the line 2—2 of Fig. 1.

Fig. 3 is a fragmentary elevation of the preferred form of the invention mounted in operative relation to a balanced scale beam.

While I have shown in the drawings and shall herein describe in detail, the preferred embodiment of my invention, it is to be understood that I do not thereby intend to limit the invention to the specific form disclosed, it being contemplated that various changes may be made by those skilled in the art without departing from the spirit and scope of the invention as expressed in the appended claims.

As illustrated in the drawings the preferred form of the invention is disclosed as comprising a hollow support or bracket member 1 having at its upper end an indicator housing 2 and at its lower end a casing 3. An indicating pointer 4 is mounted on a horizontal pivot pin 5 by means of a hub-like member 5ª. The pivot pin 5 is preferably formed at its opposite ends to provide knife edges 6 which engage V-shaped bearings 7 in the front and rear walls of the support. The hub 5ª has a weighted member in the form of a vane 8 fixed to its lower end, said vane being adapted to hold the pointer normally in its vertical position as shown in the drawings. This weighted vane acts as a pendulum to bring the pointer to its neutral position.

As illustrated in Fig. 3, the preferred form of the invention may be mounted adjacent the end of a scale beam 9, which beam has a fulcrum knife edge at 10 and is provided with an adjustable balance weight 11. The free end of the scale beam is arranged to vibrate between the usual pair of stops 12 and is preferably provided with a horizontally extending part 13 adjacent its end arranged to actuate the indicating pointer. As illustrated herein, the hub 5ª has a horizontally extending arm 14 secured thereto, the outer end of said arm being bifurcated at 15 as shown most clearly in Fig. 1. This bifurcated portion straddles the part 13 on the outer end of the scale beam and preferably provides a lost motion connection therewith so that when the pointer is in its vertical position the beam 9 will have a slight play to enable it to be balanced accurately.

It will be apparent that the pointer 4 is limited in its movement by the amount of play of the beam 9 intermediate the beam stops 12. Thus with the weight 11 properly adjusted to balance at the desired weight and the scale pan or hopper (not shown) empty, the pointer will be at one side of the vertical or neutral point and will indicate "light". As material is discharged into the scale hopper and approaches a balance, the beam 9 is finally lowered from the upper stop 12. As soon as the beam leaves the stop, the pointer will move towards its vertical position, thus indicating to the operator that a balance is being reached. The operator is thereby warned to add additional material slowly. When the pointer has reached its vertical position, the final balance may be obtained directly by means of the beam 9 because of the lost-motion between the beam and the bifurcated arm 14.

As illustrated herein an arm 16 is preferably provided on the hub 5ª and extending in the opposite direction to the arm 14. A weight 17 is adjustably mounted on this arm to permit the pivoted structure to be balanced.

Preferably a liquid such as oil is placed in the casing 3 so as to retard the action of the vane 8 and thereby more quickly bring the pointer to rest. Such a liquid acts as a dampener for the pointer and cushions the shocks that would otherwise be transmitted to the device with sudden changes in the weight of the material in the scale hopper.

The invention is readily adapted for use with scale beams and provides a definite and effective indication of the approach of a balanced condition. By providing a certain amount of play of the beam relatively to the straddling portion 15 of the arm 14, the final accurate weighing may be accomplished by means of the beam scale alone. In this way the accuracy of the beam scale is not altered by reason of any contact with the indicating device.

I claim as my invention:

1. In combination with a scale beam, an indicating device comprising a support, a pointer pivotally mounted by means including a pair of knife edges extending transversely of and resting on said support, an arm extending laterally of said pointer and connected to move therewith and having a bifurcated end portion adapted to straddle a part on the scale beam, a casing attached to said support below said knife edges and containing a liquid and a vane like member suspended from said pointer into said liquid, said vane being rigid with said pointer so as to dampen the vibrations therein.

2. An indicating device for scale beams comprising a support adapted to be positioned adjacent the beam, a member pivotally mounted on said support arranged to engage a portion of the beam, and a weighted member hanging from said member arranged normally to support said member on a level with the balanced position of the beam.

3. An indicating device for scale beams comprising a support adapted to be positioned adjacent the free end of the beam, a member pivotally mounted on said support and having a bifurcated portion arranged to straddle a part on the beam, a weighted member suspended from said pivotally mounted member, means adjustable to maintain said pivotally mounted member normally on a level with the balanced position of the beam and an indicating pointer connected to said pivotally mounted member.

4. An indicating device for scale beams comprising a support adapted to be positioned adjacent the beam, an indicating pointer mounted on a pivot extending transversely of the beam, said indicating pointer extending upwardly from said pivot, an apertured housing at the upper end of said support for the end of said pointer, a weighted vane extending downwardly from said pivot arranged normally to hold the pointer in its vertical position, a casing secured to the lower end of the support enclosing said vane and means secured to said pointer arranged to be engaged by a part on the scale beam when the beam is in an unbalanced position.

5. The combination with a scale beam, of an indicating device comprising a member straddling a portion of the beam adjacent its free end, means arranged normally to support said member on a level of the balanced position of the beam including a movably mounted vane, a casing surrounding said vane and adapted to contain a liquid to dampen the vibrations thereof and an indicating device connected to said member arranged to indicate when the member is above or below said normal position.

6. The combination with a scale beam of an indicating device comprising a member engaging a portion of the beam adjacent its free end, means arranged normally to support said member on a level of the balanced position of the beam including a pivotally mounted weighted vane, a casing surrounding said vane and adapted to contain a liquid to dampen the vibrations thereof and an indicating device connected to said member arranged to indicate when the member is above or below said normal position.

7. In combination, a scale beam, a support positioned adjacent the free end of the beam, a member movably mounted on said support, said member and beam having interengaging portions arranged to permit a slight vertical play therebetween, an indicating device actuated by said member arranged to indicate movement of the beam beyond that permitted by said interengaging portions and means including a weighted member for dampening the vibrations of said indicating device.

8. In combination, a scale beam, a support positioned adjacent the free end of the beam, a member movably mounted on said support, said member and beam having interengaging portions providing a lost motion connection therebetween, an indicating device actuated by said member arranged to indicate movement of the beam beyond that permitted by said lost motion connection, a pivotally mounted vane connected to said member and means surrounding said vane adapted to contain a liquid for dampening the vibrations of said indicating device.

9. An indicating device for scale beams comprising a support adapted to be positioned adjacent the beam, an indicating pointer pivotally mounted on said support, means for connecting said pointer to the adjacent end of the scale beam, means including a vane for dampening the vibrations of said pointer and a casing surrounding said vane and containing a liquid.

10. An indicating device for scale beams comprising a support adapted to be positioned adjacent the beam, an indicating pointer pivotally mounted on said support, means for connecting said pointer to the adjacent end of the scale beam and means including a weighted vane for dampening the vibrations of said pointer.

In testimony whereof, I have hereunto affixed my signature.

CHARLES S. JOHNSON.